United States Patent [19]
Ehrlich

[11] 4,358,276
[45] Nov. 9, 1982

[54] EDUCATIONAL DEVICES

[76] Inventor: Robert Ehrlich, 10020 Commonwealth Blvd., Fairfax, Va. 22032

[21] Appl. No.: 285,300

[22] Filed: Jul. 20, 1981

[51] Int. Cl.³ .............................................. G09B 23/08
[52] U.S. Cl. ................................................... 434/302
[58] Field of Search ............. 434/300, 302; 73/382 R; 354/350

[56] References Cited

U.S. PATENT DOCUMENTS

| | | | |
|---|---|---|---|
| 874,110 | 12/1907 | Packard | 434/302 X |
| 2,498,168 | 2/1950 | Lloyd | 354/350 |
| 3,688,415 | 9/1972 | Stehl | 434/302 |
| 3,774,317 | 11/1973 | Balamuth | 434/302 |
| 3,955,291 | 5/1976 | Michaud | 434/302 |

Primary Examiner—Harland S. Skogquist

[57] ABSTRACT

A simple, durable, inexpensive educational device for demonstrating the physical properties of colliding, accelerating and vibrating objects, especially suitable for use by educational institutions at or below the college level is described. The device consists of a pressure sensitive medium affixed to a hard flat surface which may be made to vibrate while one or more balls are made to roll on the surface, resulting in visible imprints in the form of dotted or wavy lines. The distance between dots or the individual undulations of the wavy lines serve to mark the positions of the balls at equally spaced instants of time, and thereby allow a determination of the ball velocities and accelerations without requiring compressed air, spark timers, or stroboscopic photography.

11 Claims, 4 Drawing Figures

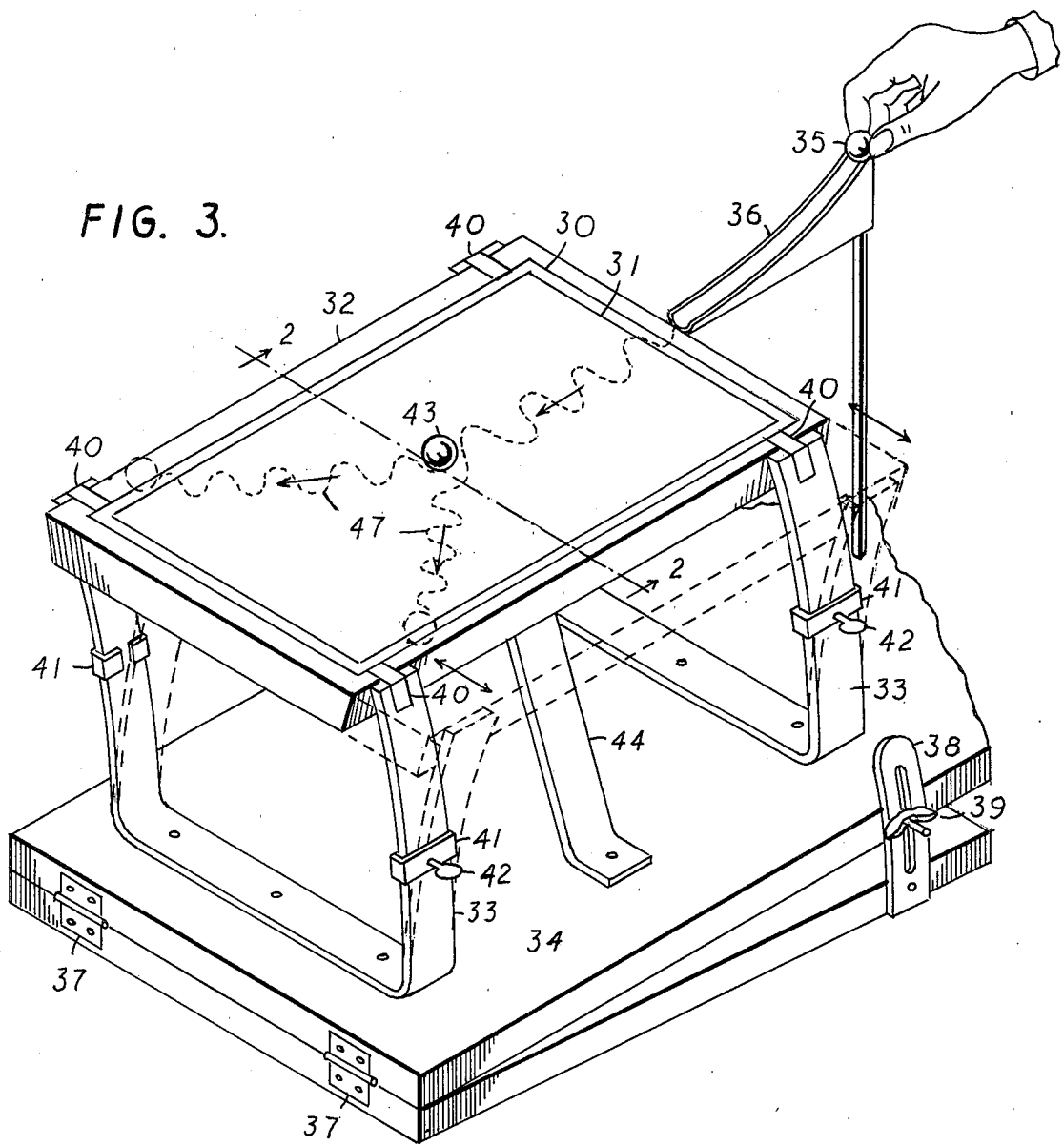
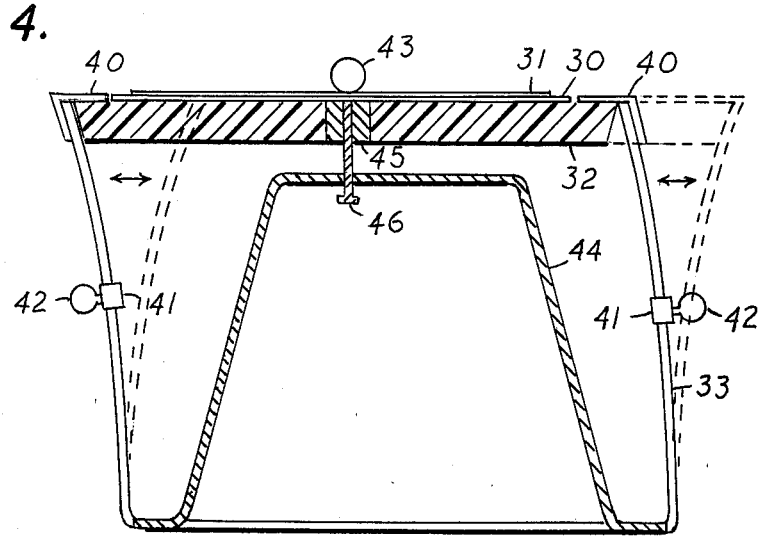

EDUCATIONAL DEVICES

BACKGROUND OF THE DISCLOSURE

1. Field of the Invention

This invention relates to educational devices, and more particularly to an educational device for demonstrating the physical properties of accelerating objects, colliding objects, and vibrating objects, referred to as a vibration device.

2. Description of the Prior Art

As an educational device, the vibration device is a fundamental tool for the teaching of many principles of mechanics at the college and/or secondary school level. Numerous effects have been made to construct educational devices for studying the physical properties of: (1) accelerating and falling objects, (2) colliding objects in a plane, and (3) vibrating objects. Examples of some efforts are typified by the following U.S. patent numbers in each of the three areas: (1) 874,110 and 1,807,615; (2) 3,650,048 and 3,955,291; (3) 3,688,415. The devices described therein, although satisfactory in some respects, do not possess the combined advantages of being very inexpensive, versatile, rugged, easily assembled, relatively portable, and capable of providing a record on ordinary paper showing the position of a moving object at equally spaced instants of time, when compared to the present invention.

SUMMARY OF THE INVENTION

It is therefore an object of the present invention to provide an educational device which is simpler, more versatile, more durable, less expensive, easier and cheaper to maintain and use, than prior art devices, and otherwise more suitable for use in learning institutions at and below the college level.

It is further an object of the present invention to provide an educational device for demonstrating the physical properties of accelerating objects, colliding objects in a plane, and vibrating objects.

It is further an object of the present invention to provide an educational device which produces a visible record from which the position of a rolling ball at equally spaced instants of time can be determined, and to so do more conveniently and inexpensively than by other existing methods, such as by stroboscopic photography or spark timers.

It is further an object of the present invention to provide an educational device which produces a visible record from which the positions of two colliding balls in a plane at equally spaced instants of time can be determined, and to do so more conveniently and inexpensively than by other existing methods.

The foregoing objects and others are accomplished in accordance with the present invention by providing an educational device comprising a hard flat surface to which carbon paper or other pressure sensitive medium is attached, a means of causing the surface to vibrate at a constant frequency, and one or more balls which roll on the surface leaving a visible imprint having such a nature so as to permit a determination of the position of the balls at a series of equally spaced instants of time. If the vibrations of the surface occur in a horizontal direction, the visible imprints have the form of wavy lines, whereas if the vibrations of the surface occur in a direction perpendicular to the surface, the resulting pressure fluctuations of the ball on the pressure sensitive medium create visible imprints having a periodic variation in darkness or alternatively lines of dots in the case of a sufficiently light ball which actually hops along the surface as the surface vibrates. In either case, the visible imprints may be said to comprise a succession of periodic features, and they therefore permit the position of the balls at equally spaced instants of time to be determined.

The hopping motion of a sufficiently light ball in the case of a surface vibrating in a direction perpendicular to itself, causes the distance between adjacent dots in a line of dots to be somewhat nonuniform. However, for a high frequency vibration, such as the 120 Hz for a plate driven by an electromagnet powered by a 60 cycle line voltage, the large number of closely spaced dots allows one to obtain a reliable value for the average dot spacing in computing the velocity of a ball.

To investigate the physical properties of collisions in a plane, one may either project one ball towards a second stationary target ball, or alternatively project two balls towards one another. The law of conservation of momentum may be verified in such an experiment by determining the vector velocities of the balls before and after the collision, where the velocity magnitudes of the balls can be obtained by dividing the average distance between successive periodic features in the visible imprints by the surface vibration period, and where the velocity directions can be obtained by drawing lines through the visible imprints along their length. To investigate the physical properties of accelerating objects no target ball is used, and the vibrating surface is inclined to the horizontal. In this case, the visible imprint of a projectile ball should show a uniform increase in the distance between successive periodic features, permitting a verification of the relationships between distance, velocity and time in uniformly accelerated motion, and further permitting a test of the expected dynamical behavior of a sphere which rolls down an inclined plane of known inclination.

These two examples of experiments are not exhaustive, and are only meant to be illustrative of the range of experiments possible using the vibration device.

BRIEF DESCRIPTION OF THE DRAWINGS

FIG. 3 is a perspective view of an alternative construction of the vibration device affixed to a supporting base whose angle with the horizontal may be adjusted.

FIG. 4 is a section through line 2—2 of FIG. 3 showing the details of a release mechanism which initiates the oscillations of the surface.

DESCRIPTION OF THE PREFERRED EMBODIMENT

Figure 1:
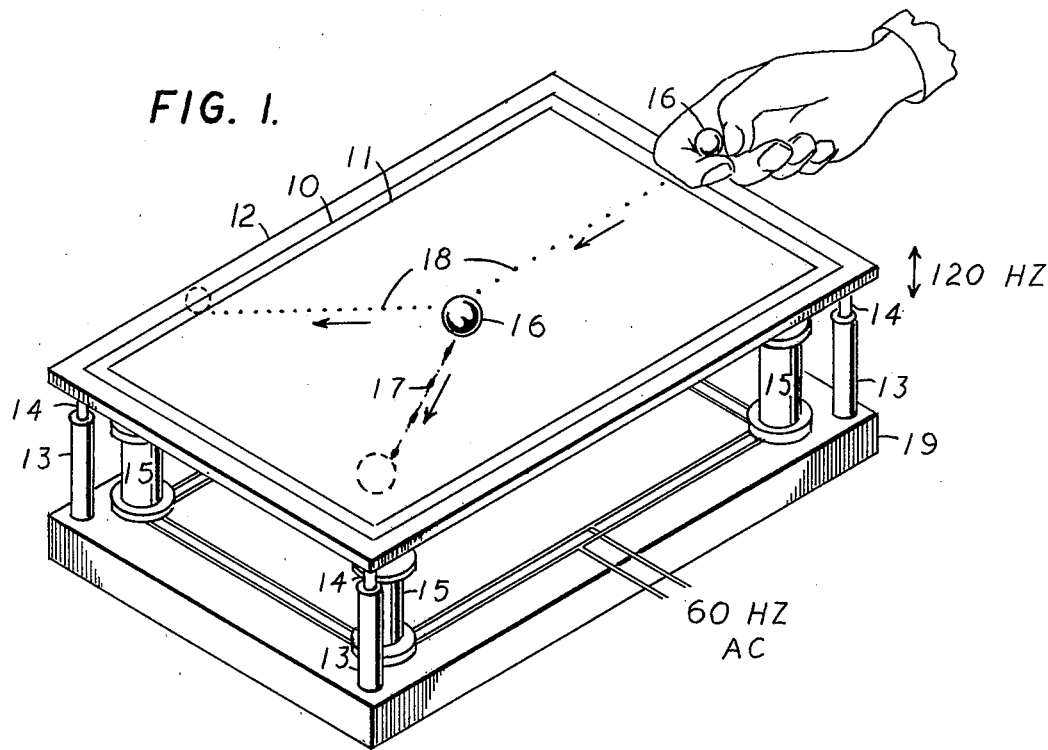
FIG. 1 is a perspective view of the preferred embodiment of the vibration device.
Figure 2:
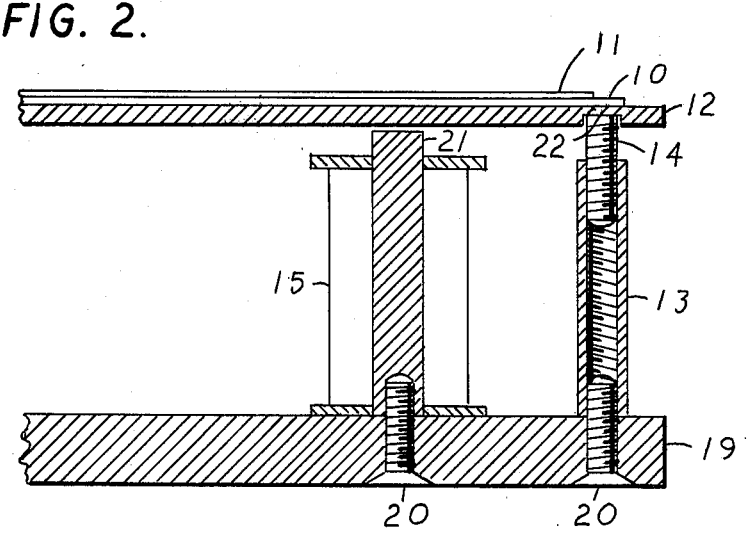
FIG. 2 is an enlarged section drawing of one electromagnet and vertical support for the preferred embodiment of the vibration device.

FIG. 1 shows the preferred embodiment of this invention, which includes six major elements: (1) a pressure sensitive medium such as carbon paper 10 placed sensitive side up beneath a sheet of ordinary paper 11, (2) a flat hard surface 12 consisting for example of iron or steel sheet approximately ⅛" thick to which the pressure sensitive medium is attached, (3) a number of supporting members 13 and height adjustment screws 14 on which the bottom of the steel sheet rests, (4) a number of iron core electromagnets 15 powered in phase by a standard 60 cycle line voltage placed just beneath the steel sheet which cause the steel sheet to vibrate as it is periodically attracted by the electromagnets, (5) one or more balls 16 of sufficient weight such that when said ball rolls on said pressure sensitive surface while it vibrates a visible imprint is created having a periodically varying darkness 17 which if the balls are sufficiently light, consists of lines of evenly spaced dots 18 having a regular spacing, (6) A base 19 to which the supporting members and electromagnets are attached by screws 20. The adjustment screws on which the steel sheet rests allow the clearance between the open poles 21 of the electromagnets and the surface to be varied. To obtain the desired maximum amplitude vibration of the surface one turns the adjustment screws until the audible sound of the surface vibrating against the electromagnet poles is loudest. The indentations in the surface 22 in which the adjustment screws sit, but do not fit snugly, are to keep the surface from moving laterally during its vertical vibrations. They also allow the vibration device to be tilted with respect to the horizontal when studying the acceleration of a ball rolling down an inclined plane, without the surface sliding off the supports.

ALTERNATIVE CONSTRUCTION

An alternative construction is described which differs from the preferred embodiment in that:
(1) The vibrations of the surface are free rather than driven, (2) the vibrations of the surface occur in a horizontal direction rather than perpendicular to the surface, (3) the vibrations are initiated by a release mechanism, (4) a means for launching the projectile ball onto the surface is provided.

FIG. 3 shows this alternative construction, which consists of five major elements: (1) a pressure sensitive medium such as carbon paper 30 placed sensitive side up beneath a sheet of ordinary paper 31, (2) a flat surface 32 to which the pressure sensitive medium is attached, (3) one or more rigid yet resilient members 33 attached to the surface, and also attached to an unmoving object in the form of a base 34, which produce horizontal vibrations of the surface when the members are deformed and then released, (4) at least one ball 35 projected onto the surface, and (5) a means for rolling the projectile ball onto the surface such as a launching channel 36 attached to the base.

Other elements in addition to the five major ones include: a hinged connection 37 between base and table, an arc-shaped track 38, and wing nut 39 on opposite sides of the base which allows its angle to the horizontal to be set; hinges 40 which attach each member to the surface, so as to allow the surface to remain flat during the oscillations, and thereby reduce damping; small weights 41 attached by thumb screws 42 to each of the members to allow precise equalization of the members' oscillation frequencies; a stationary target ball 43 toward which a projectile ball rolls; and a release mechanism that initiates the oscillations of the surface, which consists of a bracket 44 attached to the base, a cylindrical guide channel 45 attached to the surface, and a pin 46 which may be inserted through holes in the bracket and guide channel when the members are deformed. The release mechanism can be manually activated just prior to the projectile ball reaching the surface, the ensuing oscillations of the surface, causing the rolling balls to leave visible imprints having the appearance of wavy lines 47 due to the horizontal oscillations of the surface.

Although the visible imprints in the preferred embodiment and the alternate construction have a distinctly different appearance, they may both be described by noting that their geometric shape and/or darkness show periodic features over most of their length.

I claim:
1. An educational device comprising
   a. a flat hard surface,
   b. a pressure sensitive medium attached to said surface,
   c. at least one ball of sufficient weight, such that when said ball rolls on said pressure sensitive medium, it leaves a visible imprint, hereafter referred to as said ball's trail,
   d. a means for producing vibrations of said surface and attached pressure sensitive medium having sufficient amplitude, frequency, and duration, such that the geometric shape and/or darkness of said ball's trail shows periodic features over most of its length.
2. An educational device according to claim 1 wherein said means for producing vibrations of said surface produce vibrations in a horizontal direction, thereby resulting in said ball's trail having the appearance of a wavy line from which a direct determination can be made of the position of the said ball at a series of equally spaced instants of time.
3. An educational device according to claim 1 wherein said means for producing vibrations of said surface cause it to approximately undergo harmonic motion in a direction approximately perpendicular to the surface thereby resulting in said ball's trail having the appearance of a line of periodically varying darkness or a line of dots from which a direct determination can be made of the position of said ball at a series of equally spaced instants of time.
4. An educational device according to claim 3 wherein said means of producing vibrations of the surface is one or more electromagnets placed near the surface.
5. An educational device according to claim 4 wherein said surface is a sheet of steel or iron.
6. An educational device according to claim 4 further comprising support members on which the surface rests, having a height which can be adjusted, thereby varying the clearance between the electromagnet poles and the surface.
7. An educational device according to claim 1 wherein said pressure sensitive medium consists of a sheet of carbon paper.
8. An educational device according to claim 1 further comprising an additional ball hereafter referred to as a target ball which is located on said surface and which is struck by said projectile ball.
9. An educational device according to claim 2 wherein the means for vibrating said surface comprises at least one member which
   a. is attached to said surface,
   b. has means for attachment to an object sufficiently massive to resist all but neglible motion due to oscillations of said surface,
   c. is of sufficient resilience, stiffness, and mass, so as to cause said surface to undergo oscillations of said sufficient amplitude, frequency and duration when said member is released from a deformed configuration.

10. An educational device according to claim 9 wherein the means of attachment between said member and said surface freely permits the angle between said member and said surface to vary.

11. An educational device according to claim 10 further comprising a release mechanism consisting of
 a. a bracket having a hole which is attached to said massive object,
 b. a cylinder having a hole along its axis which is attached to said surface,
 c. a pin which may be inserted through the holes in said bracket and said cylinder only when said member is deformed by a sufficient amount such that when said pin is removed oscillations of said surface occur.

* * * * *